United States Patent
Toohey et al.

(10) Patent No.: US 6,961,729 B1
(45) Date of Patent: Nov. 1, 2005

(54) PROCESSING IN PARALLEL UNITS OF WORK THAT PERFORM DML OPERATIONS ON THE SAME SPANNING ROWS

(75) Inventors: Rosanne Park Toohey, Redwood Shores, CA (US); Jonathan D. Klein, Redwood City, CA (US); Amit Ganesh, Mountain View, CA (US); Gary C. Ngai, Saratoga, CA (US); Dmitry Mikhailovich Potapov, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 501 days.

(21) Appl. No.: 09/771,292

(22) Filed: Jan. 25, 2001

(51) Int. Cl.[7] ............................................. G06F 17/30
(52) U.S. Cl. ................ 707/101; 707/103 R; 707/103 Y
(58) Field of Search ............................. 707/101, 103 Y, 707/103 R, 100, 103, 1, 201, 200

(56) References Cited

U.S. PATENT DOCUMENTS

| | | | | |
|---|---|---|---|---|
| 5,848,408 A | * | 12/1998 | Jakobsson et al. ............. | 707/3 |
| 5,956,704 A | * | 9/1999 | Gautam et al. ................ | 707/1 |
| 6,065,012 A | * | 5/2000 | Balsara et al. .............. | 707/102 |
| 6,078,924 A | * | 6/2000 | Ainsbury et al. ........... | 707/101 |
| 6,108,653 A | * | 8/2000 | Peereira ......................... | 707/7 |
| 6,339,777 B1 | * | 1/2002 | Attaluri et al. ......... | 707/103 R |
| 6,438,562 B1 | * | 8/2002 | Gupta et al. ................ | 707/201 |
| 6,518,974 B2 | * | 2/2003 | Taylor et al. ............... | 345/582 |

OTHER PUBLICATIONS

Park et al. (A transaction management Scheme with mark in decision supporting environment), Web Information Engineering, 2000, date: Jun. 19–21, 2000, p.: 196–203.*
Karabeg et al. (Simplification rules and complete axiomatization for relational update transactions), ACM transaction on database system, date: 1991, pp.: 439–475.*

* cited by examiner

*Primary Examiner*—Jean M. Corrielus
*Assistant Examiner*—Baoquoc N. To
(74) *Attorney, Agent, or Firm*—Marcel K. Bingham; Hickman Palermo Truong & Becker LLP (57) ABSTRACT

A mechanism is described for constructing work granules, where the work granules are constructed independently of whether two or more of the work granules are assigned to operate on a logical storage unit that contains a portion of the same row. A database system maintains transaction control data for data blocks in a manner that avoids self-deadlocks for slaves that follow a row collision protocol. A row collision protocol is a set of rules or steps that slaves follow to ensure that only one subtransaction in a distributed transaction updates a spanning row. Thus, for a particular spanning row, a single subtransaction modifies all the row pieces of the spanning row in any data block containing any row pieces of the spanning row. Consequently, a given data block may be affected by multiple subtransactions in a distributed transaction, one subtransaction affecting a row piece in the data block, another subtransaction affecting other rows in the data block.

20 Claims, 7 Drawing Sheets

PROCESSING IN PARALLEL UNITS OF WORK THAT PERFORM DML OPERATIONS ON THE SAME SPANNING ROWS

FIELD OF THE INVENTION

The present invention relates to performing database tasks in parallel using multiple processes, and in particular, to performing in parallel parent tasks that involve DML operations.

BACKGROUND OF THE INVENTION

In typical database systems, users write, update and retrieve information by submitting commands to a database application. To be correctly processed, the commands must comply with the database language that is supported by the database application. One popular database language is known as Structured Query Language ("SQL").

Operations that modify data stored in a database are referred to as manipulation operations. The subset of commands that specify manipulation operations are referred to as Data Manipulation Language ("DML") commands. Examples of DML commands in SQL include Insert, Update, and Delete. Manipulation operations are also referred to herein as DML operations, because typically manipulation operations are performed by a database system in response to receiving DML commands.

Many database systems are multi-processing systems. Multi-processing systems are typically partitioned into nodes, where each node may contain multiple processors executing multiple concurrent processes. To fully utilize the computing power of a multi-processing system, a database system may divide a large processing task ("parent task") into smaller work granules, which may then be distributed to processes running on one or more processing nodes. Because the various work granules are being performed in parallel, the processing required by the query can be completed much faster than if the processing were performed on a single node by a single process. The number of processes that are assigned to perform a task is referred to as the degree of parallelism. In general, a task may be performed more efficiently by increasing the degree of parallelism, at least up to a particular threshold. Unfortunately, the degree of parallelism that may be achieved for DML operations is limited because the process of dividing DML operations into work granules is affected by how work granules are processed as transactions and how data is stored in database systems.

STORAGE OF DATABASE DATA

In relational database systems, the data containers that hold data are referred to as tables, the records are referred to as rows, and the fields are referred to as columns. Each row in a table has one or more fields that hold values for each of the columns. The present invention is, however, not limited to any particular type of data container or database architecture. However, for the purpose of explanation, the examples and the terminology used herein shall be that typically associated with relational databases, where the terms "table", "row" and "column" shall be used herein to refer respectively to the data container, record, and field. In object oriented databases, the data containers are referred to as object classes, the records are referred to as objects, and the fields are referred to as attributes. Other database architectures may use other terminology.

A table has a "shape". The shape of a table is the sequence of its column data types and names. For example, the table PERSON may have two columns with following names and data type: Name of person, having the data type of VARCHAR (i.e. a variable length string), and AGE, having the data type INTEGER. The shape of table PERSON is:

<Name of Person VARCHAR, Age INTEGER>The shape of a row is the shape of the table that contains the row.

A logical storage unit is a unit of storage that may contain rows of the same shape. Databases use various types of logical storage units to store data, each type corresponding to a level of granularity. Typically, the logical storage structure at the lowest level of granularity is a data block. Other examples of logical storage units at higher levels of granularity are an extent, which is a logical storage unit that contains a set of data blocks stored contiguously in a data file, or a segment, which is a logical storage unit that contains one or more extents. A table is also an example of a logical storage unit.

Sometimes for various reasons, some database systems store a row in more than one data block. A row that is stored in more than one data block is referred to herein as a spanning row. Portions of rows stored in a data block are referred to as row pieces.

Typically, when a database system splits a task into work granules, it divides the task according to logical units of storage. For example, a task may be executing a query against a table. Performing the task involves operations such as scanning the table to retrieve the data requested by the query. These operations may be divided into work granules according to groups of data blocks that compose a table, each work granule corresponding to a subtask of scanning and retrieving data from a group of the data blocks belonging to the table.

Unfortunately, some database systems that support spanning rows restrict how a parent task may be divided into work granules, and, consequently, limit the degree of parallelism that may be achieved. Prior to techniques disclosed herein, if these database systems constructed work granules for DML operations in such a way that data blocks assigned to a work granule shared a portion of a spanning row with a data block assigned to another work granule, then parallel distributed transactions may self-deadlock. Causes of self-deadlocking will be described in greater detail.

To work within this restriction, a database system could split work using logical storage units that are guaranteed not to share portions of any spanning row. Sets of logical storage units that do not share a portion of any spanning row are referred to as "contained storage units". Work granules that are constructed to account for this restriction are referred to as "contained work granules".

Unfortunately, for many tables the table itself is the lowest-level contained logical storage unit. That is, the logical storage units at lower levels of granularity that make up the table (e.g. segments, extents and disk blocks) are not "contained". For a task that entails applying DML operations to such a table, the highest degree of parallelism that may be obtained is 1.

Higher degrees of parallelism for DML operations may be obtained by database systems that support table partitioning. With table partitioning, an object, such as a database table, is divided up into sub-tables, referred to as "partitions". The most common form of partitioning is referred to as range partitioning. With range partitioning, each individual partition corresponds to a particular range of values for one or more columns of the table. All rows that have values that fall into the range associated with a partition are entirely contained within that partition. As a consequence, a spanning row is completely contained within a partition. For example, one column of a table may store date values that fall within a particular year, and the table may be divided into twelve partitions, each of which corresponds to a month of that year. All rows that have a particular month in the date column would then be inserted into the partition that corresponds to that month. As a result, partitions are contained.

When constructing work granules for performing DML operations upon a partitioned table, the highest degree of parallelism that may be obtained is equal to the number of partitions in the table. Unfortunately, it is often desirable to obtain higher degrees of parallelism, or there may be tables that are not suitable for partitioning. Furthermore, many users would prefer a mechanism for dividing a parent task into work granules that works independently of whether the work granules are contained, allowing users to avoid having to account for parallelism when implementing partitioning, or to avoid having to implement and administer partitioning when there is no other reason to do so other than to achieve parallelism for DML operations.

Distributed Transactions

A reason for the containment restriction stems from the way a database system may execute work granules as part of a distributed transaction. A transaction is a logical unit of work that is performed as an atomic unit. That is, to ensure the integrity of a database, the database must reflect all the changes made by a transaction, or none of the changes made by the transaction. Consequently, none of the changes made by a transaction are permanently applied to a database until the transaction has been fully executed. A transaction is said to "commit" when the changes made by the transaction are made permanent to a database.

A distributed transaction is composed of multiple transactions referred to as subtransactions. The subtransactions of a distributed transaction are executed as an atomic unit of work. When the parent task is performed as a distributed transaction, the work granules assigned to a particular process are executed together under a particular subtransaction. Processes that execute work granules as part of a subtransaction are referred to herein as slaves.

To support managing transactions, data blocks may contain transaction control data that identifies what transactions affect data in a data block. A transaction that affects a data block is herein referred to as an interested transaction with respect to the data block. In order for the database system to complete processing of a transaction, the transaction control data must identify an interested transaction until the transaction completes.

If work granules executed under a distributed transaction were not self contained, then it is possible that multiple slaves may be assigned to modify row data in a single data block. The transaction control data in a data block would have to identify each of the subtransactions associated with the multiple slaves. For example, a task entails DML operations to be applied to the table PERSON. The task is divided into numerous work granules, which are assigned to a set of slaves and executed as a distributed transaction. The set of slaves include a slave A, B, C, and D. The distributed transaction includes subtransactions A, B, C, and D, which are being executed by slaves A, B, C, and D, respectively. Work granules A, B, C, D have been assigned to slaves A, B, C, and D, respectively.

Work granule A entails performing DML operations to a data block. The data block contains row A, and row pieces of spanning rows B, C, and D. Work granule B, C, and D entail operations to spanning rows B, C, and D. Thus, not only will subtransaction A affect the data block, but subtransactions B, C, and D will also affect the same data block. As mentioned before, to complete an interested transaction, the transaction control data in a data block must be able to identify the interested transaction until it commits. Because subtransactions A, B, C, D must all commit together to complete the distributed transaction, the transaction control data in the data block must be capable of identifying all four subtransactions concurrently.

At any given time, transaction control data can only concurrently identify a threshold quantity of interested transactions due to the fact that the transaction control data is only allocated a certain amount of space in the data block. If, for a given data block, the quantity of interested subtransactions in a distributed transaction exceeds the threshold, then the subtransactions are deadlocked, and the distributed transaction can not be completed. In the current example, the transaction control data in the data block may identify no more than 3 subtransactions. Thus, if the transaction control data identifies subtransactions A, B, and C, it can not concurrently identify subtransaction D. Subtransaction D can not be completed, preventing the other subtransactions in the distributed transaction from completing. For this reason, many database systems supporting spanning rows are limited to constructing work granules that are contained.

A deadlock that occurs because transaction control data can not concurrently support all interested subtransactions of a distributed transaction is referred to herein as self-deadlock. It is referred to as self-deadlock because the deadlock will occur whenever it is executed due, in part to the way a parent task is divided into the work granules and executed by subtransactions.

Self-deadlocks are distinguishable over other types of deadlocks that can occur when executing multiple independent transactions, that is, transactions that are not part of the same distributed transaction. In particular, independent transactions involved in a deadlock can be resolved by aborting some of them and allowing others to proceed. For example, four independent transactions are attempting to update a data block. The data block has transaction control data that only supports three interested transactions. One of the interested transactions may be aborted and reexecuted later, or may simply wait for one of the three transactions to commit.

Resolving deadlocks in this manner is not practical for a distributed transaction. One subtransaction of a distributed transaction may not be re-executed later because all subtransactions must either commit or abort. Further, if the entire distributed transaction is aborted, then when it is re-executed, the same self-deadlock will re-occur.

Based on the foregoing, it is clearly desirable to provide a mechanism that allows a task to be divided into work granules that are not contained and that may be executed without incurring self-deadlocks.

SUMMARY OF THE INVENTION

The foregoing needs, and other needs that will become apparent from the following description, are achieved by the present invention, which comprises, in one aspect methods for constructing work granules, where the work granules are constructed independently of whether two or more of the work granules are assigned to operate on a logical storage unit that contains a portion of the same row. A database system maintains transaction control data for data blocks in a manner that avoids self-deadlocks for slaves that follow a row collision protocol. A row collision protocol is a set of rules or steps that slaves follow to ensure that only one subtransaction in a distributed transaction updates a spanning row. Thus, for a particular spanning row, a single subtransaction modifies all the row pieces of the spanning row in any data block containing any row pieces of the spanning row. Consequently, a given data block may be affected by multiple subtransactions in a distributed transaction, one subtransaction affecting a head row piece in the data block, another subtransaction affecting other unrelated non-head row pieces in the data block.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus is described for performing DML database tasks in parallel using multiple processes. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

Described herein are techniques for constructing work granules independently of whether the work granules are contained. A database system maintains transaction control data and rows for data blocks in a manner that avoids self-deadlocks for slaves that follow a row collision protocol. A row collision protocol is a set of rules or steps that slaves follow to ensure that only one subtransaction in a distributed transaction updates any given row. Thus, in the case of a particular spanning row, a single subtransaction modifies all the row pieces of the spanning row in any data block containing any row pieces of the spanning row. Consequently, a given data block may be affected by multiple subtransactions in a distributed transaction, one subtransaction affecting head row pieces in the data block, another subtransaction affecting other non-head row pieces in the data block.

Database System

Figure 1:
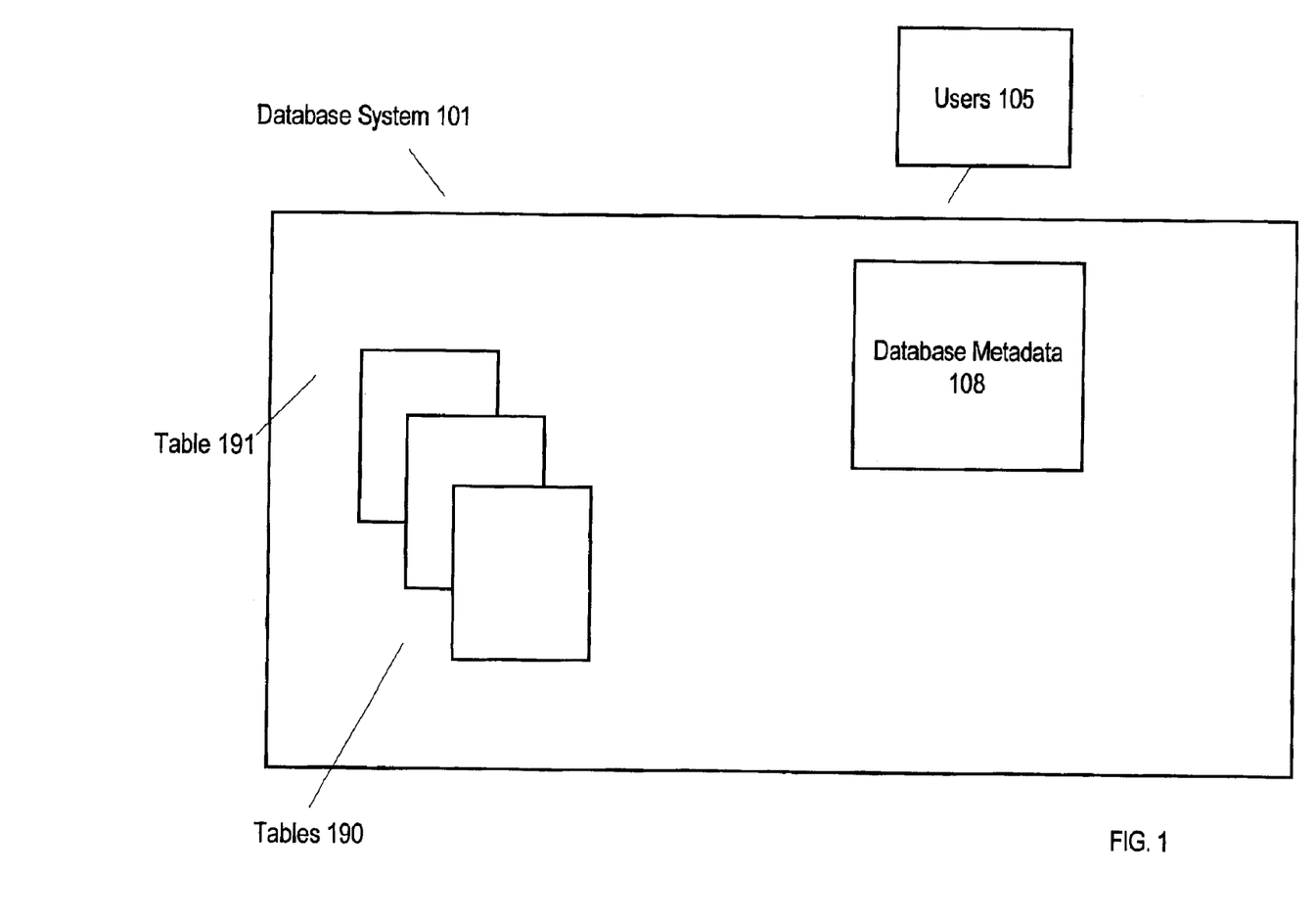
FIG. 1 is a block diagram depicting a multi-processing database system according to an embodiment of the present invention.

FIG. 1 is a block diagram that provides an overview of a database system configured to execute techniques described herein. Multi-processing database system 101 manages and stores data for users 105. Users 105 may include individual users, or collections of individuals or computers.

Database system 101 manages data using a variety of database objects. Database objects include tables, such as tables 190, database metadata, such as database metadata 108, indexes, and code modules. Tables 190 include table 410. Database metadata 108 is metadata that describes the configuration of a database system. Database metadata 108 defines, for example, database objects such as tables, indexes for tables, and what databases to use to store data for a table or index. Database metadata is generated in response to receiving data definition commands from a user.

Data Blocks and Transaction Lists

Figure 2A:
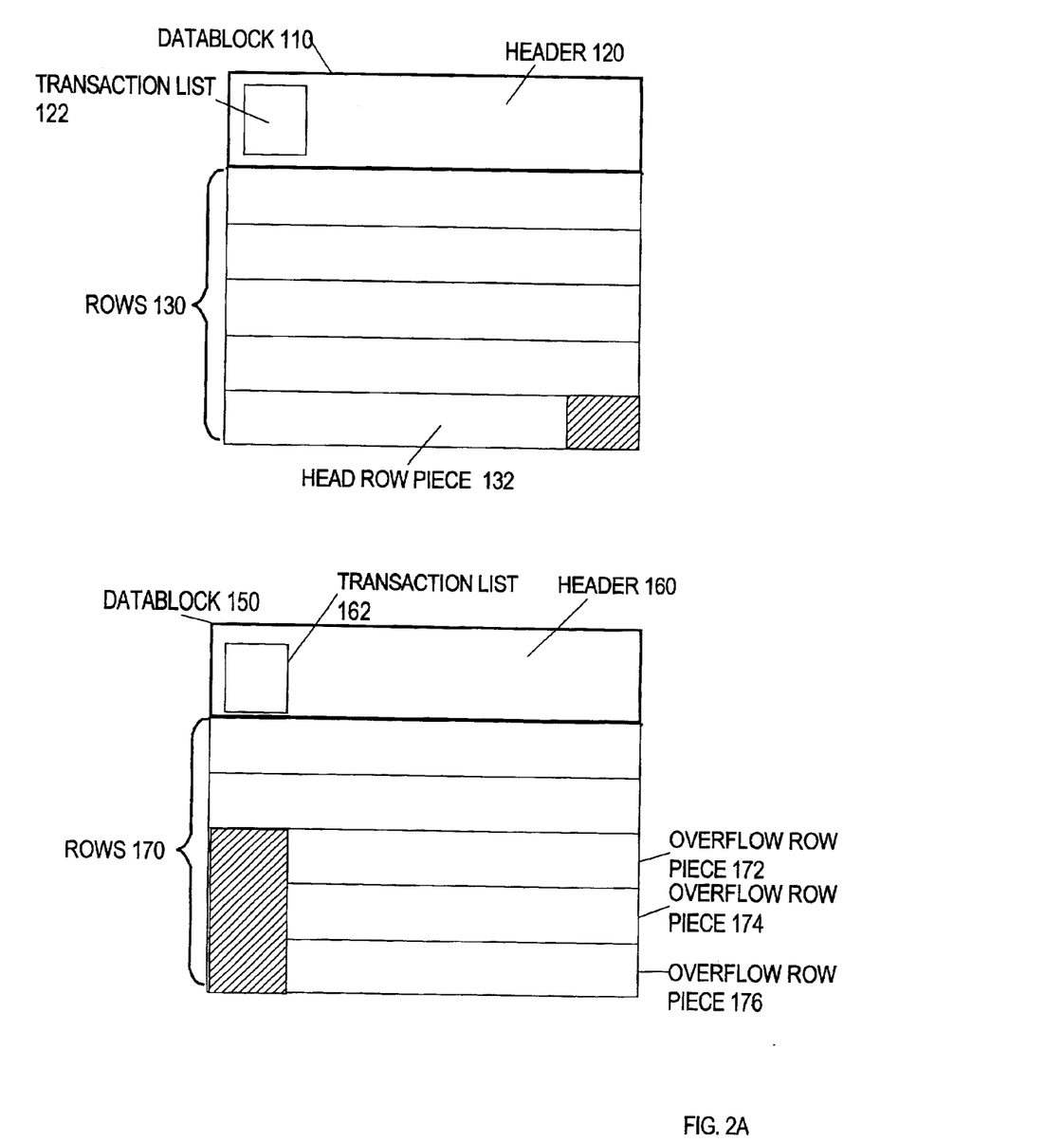
FIG. 2A is a block diagram depicting the structure of a data block according to an embodiment of the present invention.

FIG. 2A is a block diagram depicting data blocks 110 and 150. Data blocks 110 and 150 are used to store data for table 191. Data block 110 includes header 120, and rows 130. Header 120 includes a transaction list 122.

A header in a data block, such as header 120, contains data used to manage the data block. For example, header 120 contains information such as the size of the data block (e.g. how many bytes), how many rows it contains, the size of the header portion, and a transaction list. Transaction list 122 in header 120 is data that identifies interested transactions for data block 110. Similarly, data block 150 contains header 160 and rows 170.

Figure 2B:
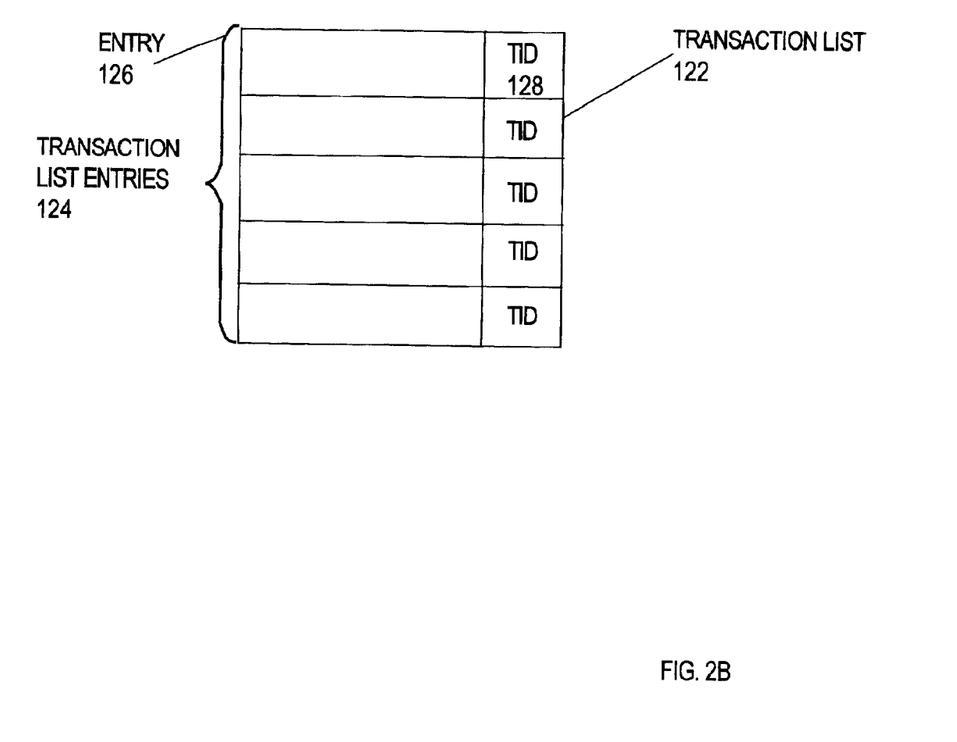
FIG. 2B is a block diagram depicting a transaction list in a data block according to an embodiment of the present invention.

FIG. 2B shows transaction list 122 in greater detail. Transaction list 122 includes transaction list entries 124. An interested transaction identified by transaction list 122 "owns" an entry in transaction list 122. Each entry contains a transaction identifier ("TID") field, such as TID 128 in entry 126. The TID field identifies the transaction that owns an entry, if any. An entry may also contain other information, that, for example, indicates whether the transaction is active, committed, or aborted, and the commit time of the transaction if the transaction is marked as committed. An interested transaction remains identified by transaction list 122 for at least as long as the transaction is active, that is, not committed or aborted.

Database system 101 stores data for a table in data blocks that may contain spanning rows. Data blocks 110 and 150 contain spanning rows. A data block is said to contain a row if it contains the whole row, or a row piece if the row is a spanning row. Data block 100 contains head row piece 132. A head row piece is a term used herein to refer to the first row piece of a spanning row. A row piece of a spanning row that is not the beginning portion of the row is referred to herein as an overflow row piece. Data block 150 contains three overflow row pieces: overflow row piece 172, overflow row piece 174, and overflow row piece 176. Overflow row piece 172 and head row piece 132 compose the same spanning row. Overflow row piece 174 and overflow row piece 176 each compose spanning rows with other overflow row pieces and head row pieces not shown. In database system 101, two or more row pieces may compose a spanning row.

Row control data indicates whether a row piece is a head piece or an overflow piece, and what data block holds a subsequent row piece. Row control data may be stored in a row or elsewhere within a data block.

Creating and Maintaining Database Blocks

When tables are created by a database system, data blocks are created and reserved for the table. The process of creating and reserving data blocks may be managed by a database administrator ("DBA"), who may control the process by issuing database definition language commands. As the table grows, a database administrator may submit further DDL to create and reserve additional data blocks for the table, or the database system may automatically create and reserve data blocks according to default parameters or parameters established by DBAs.

When data blocks are created, a portion of the data block is allotted for the header and a portion is allotted for storing rows ("data portion"). The data portion refers to the portion of the data block where rows are stored. Also, a number of entries are created in the transaction list.

As data is inserted into a data block, the allotment between the header portion of the data block and the data portion may be adjusted. For example, once a threshold number of rows are inserted into a data block, the number of entries in the data block's transaction list may be increased. Increasing the number of entries in the transaction list requires more space within the data block to store the transaction list. The space may be obtained by allotting less space for the data portion and more space for the header, creating more space for which to store more entries for the transaction list.

Inserting Overflow Rows

Before database system 101 inserts an overflow row piece into a data block, database system 101 ensures that the transaction list will have space for a sufficient number of entries after insertion of the overflow row piece. The allocation of space for at least a threshold number of entries ensures that if the row collision protocol is followed, that the transaction list contains space for a sufficient number entries such that any subtransaction of a distributed transaction that may affect a row in the data block may own an entry in the transaction list. As a result, self-deadlocks are avoided when executing the distributed transaction. According to one embodiment, a sufficient number of entries is the sum of one plus the quantity of the set of overflow pieces that includes those already in the data block and the overflow row piece to be inserted.

To illustrate how adherence to the threshold quantity avoids a self-deadlock, the following example is provided. Assume that transaction list 162 contains four entries and an additional overflow row piece is inserted in data block 150, leaving four overflow pieces. When a distributed transaction is processed, and if the row collision protocol is followed by the subtransactions of the distributed transaction, it is possible that as many as five subtransactions of the distributed transaction may affect rows in data block 150. These five include one for each of overflow row pieces 172, 174, 176, one for the just inserted overflow row piece, and one for the remainder of rows in data block 150. Because there may be five subtransactions that are interested block 150, and transaction list 162 contains only four entries, self-deadlock is possible unless space is allocated for at least one more entry.

Figure 3:
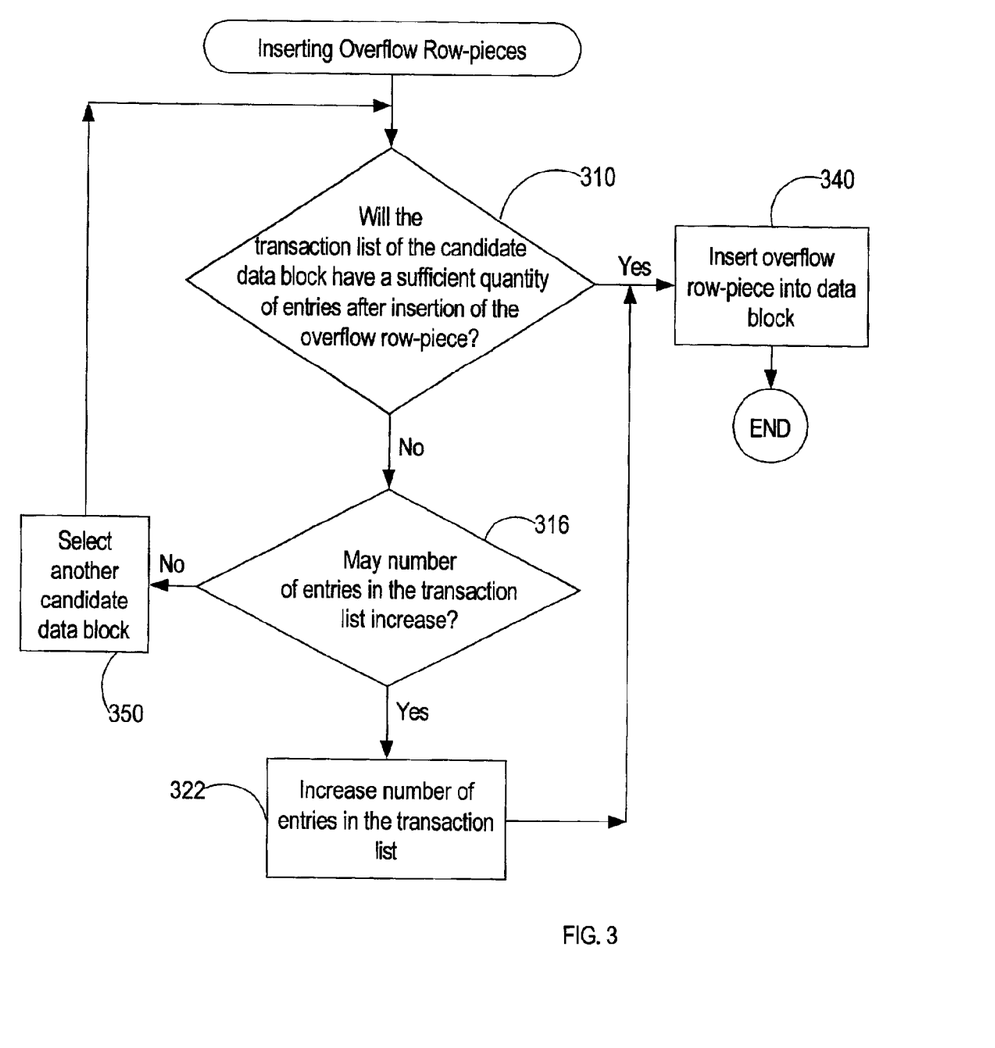
FIG. 3 is a flow chart depicting a process for inserting rows into a data block according to an embodiment of the present invention.

FIG. 3 shows the steps that are followed when database system 101 is inserting an overflow row piece into a data block. Database system 101 performs these steps once database system 101 has selected a "candidate" data block for inserting an overflow row piece.

Referring to FIG. 3, at step 310, database system 101 determines whether the transaction list of the candidate data block will have the threshold quantity of entries after insertion of the overflow row piece. If the candidate data block will have a sufficient quantity of entries after insertion of the overflow row piece, then control flows to step 340. Otherwise, control flows to step 316.

At step 340, database system 101 commences with the remainder of the process of inserting an overflow row piece into the candidate data block. Next, execution of the steps of FIG. 3 ends.

At step 316, database system 101 determines whether the number of entries in the transaction list may be increased. This determination may involve analyzing a variety of factors. For example, increasing the number entries may require increasing the size of the header within a data block. Therefore, enough unused bytes should exist within the data portion of a data block. In addition, database system 101 may limit the size of the header or the number of entries that may be contained in a transaction list. Therefore, increasing the size of the transaction list should not cause these limits to be exceeded.

If the database system 101 determines that the number of entries in the transaction list may not be increased, then database system 101 selects another candidate block at step 350 and returns to step 310.

If database system 101 determines that the number of entries in the transaction list may be increased, then database system 101 increases the number of entries in the transaction list. This may entail increasing the header's allotment of the space in a data block.

Constructing Work Granules that are not Self-Contained

Figure 4:
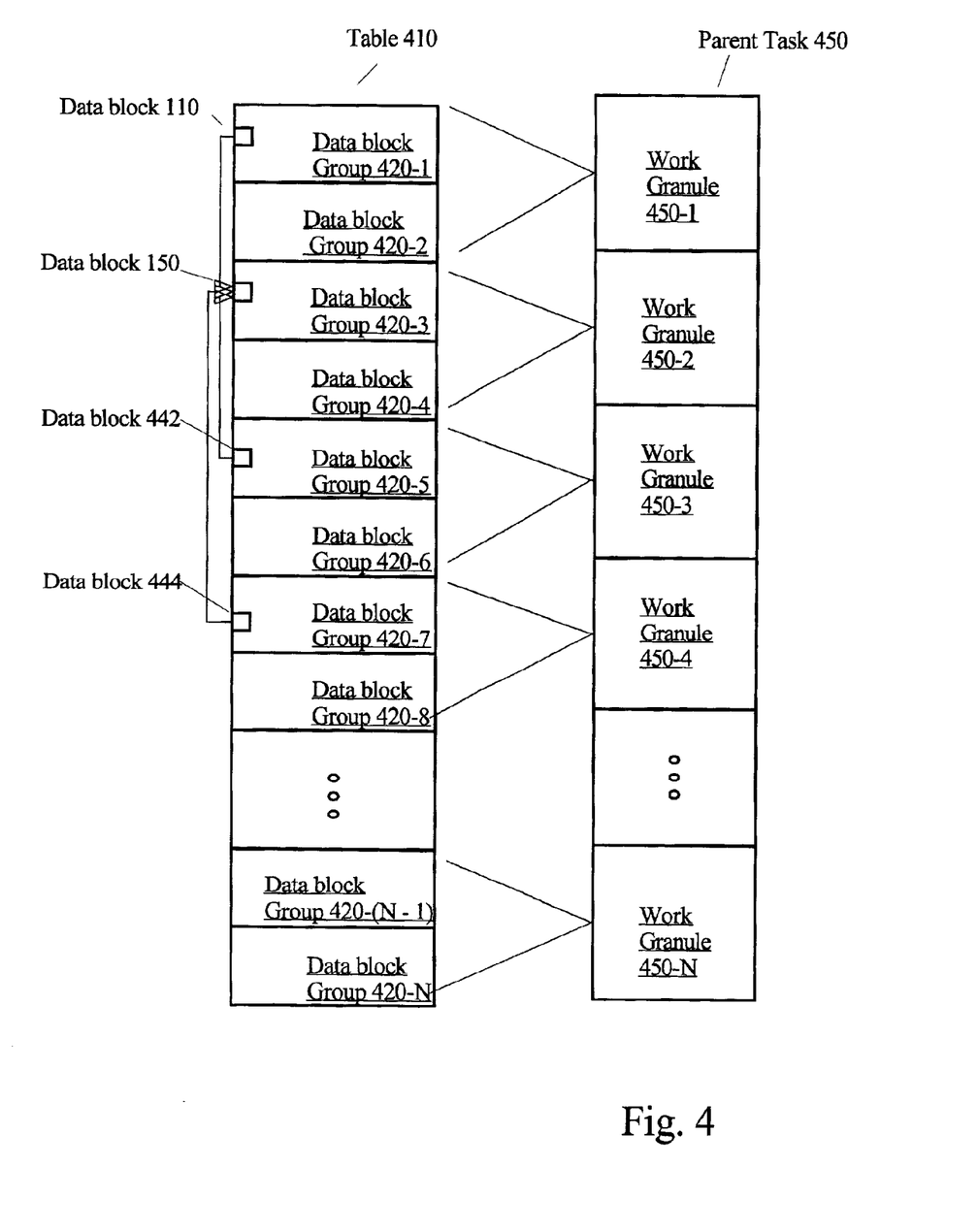
FIG. 4 is a block diagram depicting groups of data blocks assigned to work granules according to an embodiment of the present invention.

As mentioned previously, by using the techniques described herein, database system 101 may construct work granules independently of whether the work granules are self-contained. FIG. 4 is block diagram depicting a parent task divided into work granules that are not self-contained. The parent task involves performing UPDATE operations to tables 191.

Referring to FIG. 4, parent task 450 is divided into work granules 450-1 to 450-N. The work granules are assigned groups of data blocks used to store data in table 410. Each work granule in parent task 450, when executed, operates upon the groups of data blocks in table 410 assigned to the work granule. Work granule 450-1 is assigned data groups 420-1 and 420-2, work granule 450-2 is assigned data groups 420-3 and 420-4, work granule 450-3 is assigned data groups 420-5 and 420-6, work granule 450-1 is assigned data groups 420-7 and 420-8, and work granule 450-N is assigned data groups 420-N-1 and 420-N.

Work granules 450-1 through 450-4 are not self contained because each of these work granules is assigned a group of data blocks that includes at least one data block that contains a row piece of a row contained in another data block from a group assigned to another work granule. Specifically, work granule 450-1 is assigned to data block group 420-1, which includes data block 110. Data block 110 contains head row piece 132, which is part of the same spanning row that includes overflow row piece 172 in data block 150. Data block 150 is in data block group 420-3, which is assigned to work granule 450-2.

Likewise, work granule 450-3 is assigned to data block groups 420-5 and 420-6, work granule 450-4 is assigned to data block groups 420-7 and 420-8. Data block group 420-5 contains data block 442. Data block group 420-7 contains data block 444. Data block 442 contains a head row piece that is part of the same spanning row that includes overflow row piece 174. Data block 444 contains a head row piece that is part of the same spanning row that includes overflow row piece 176. Overflow row piece 174 and overflow row piece 176 are in data block 150, a data block in data block group 420-3 assigned to work granule 450-2.

The groups of data blocks may be formed using a variety of techniques, any of which may construct data blocks without having to account for whether the groups of data blocks are contained. An example of a technique for constructing work granules is row-id range partitioning. In row-id partitioning, groups are formed by assigning to each work granule a range of rows based on row-ids, where the rows that correspond to the range completely compose a group of data blocks, and where the beginning and ending of the range correspond to boundaries of data blocks in the group.

Executing the Task Using a Row Collision Protocol

Once the parent task is divided into work granules, the work granules are assigned to slaves. The parent task is executed as a transaction, each slave executing its work granules as part of a subtransaction of the transaction. When a slave executes a work granule, the slave reads in a data block assigned to the work granule.

Figure 5:
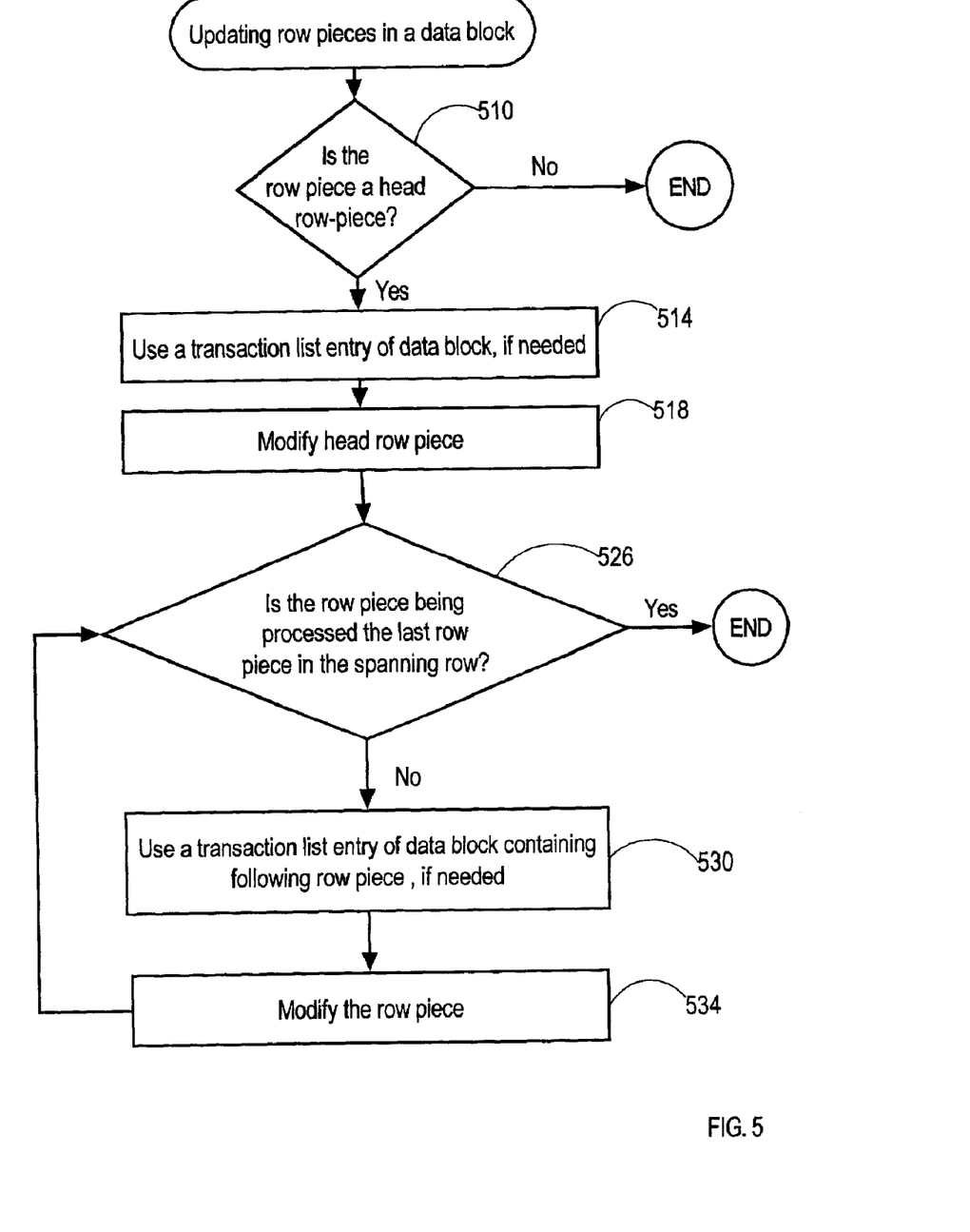
FIG. 5 is a flow chart depicting a process for modifying data according to an embodiment of the present invention.

FIG. 5 shows an expository process that is performed for DML operations that involve modifying spanning rows. A slave executes the steps for each spanning row piece that exists in a data block. The process is referred to as expository because modifying data blocks or rows contained in them may include steps not expressly depicted in FIG. 5, such as locking the data block, generating undo log entries, and modifying rows that are not spanning rows.

To avoid self-deadlocks, the steps in FIG. 5 incorporate a row collision protocol. The row collision protocol specifies that for a given spanning row, the slave assigned the data block that contains the head row piece for the row performs DML operations to that row. These update operations include modifying the head row piece and the one or more overflow row pieces. Because the slaves follow the row collision protocol for spanning rows, each data block will have a quantity of transaction list entries that is sufficient, such that there is an entry for at least every subtransaction that affects the data block. The steps are illustrated using the parent task and groups of data blocks illustrated in FIG. 4.

Referring to FIG. 5, at step 510, the slave that is processing a particular data block encounters a row piece within the data block and determines whether the row piece is a head row piece. The slave may make this determination by examining row control data that indicates whether the row piece is a head row piece. If the row piece is not an head row piece, then execution of the steps ends. In other words, the slave that is processing the data block does not process row pieces within the block that are not head row pieces. Otherwise, execution of the steps flows to step 514.

At step 514, an entry in the transaction list is used for the subtransaction of the slave, if an entry has not already being used for the subtransaction. The slave may have already used an entry for the subtransaction when, for example, other data within the block was processed by the slave during execution of the subtransaction. At step 518, the head row piece is modified.

After step 518, the slave commences processing of the overflow pieces of the spanning row to which the head row piece belongs, beginning with the overflow piece following the head row piece.

At step 526, the slave determines whether another row piece follows the row piece that is being processed in the spanning row. If another row piece does not follow the row piece being processed, then execution of the steps ends. Otherwise execution proceeds to step 530, where the slave commences processing of the following row piece.

At step 530, an entry in the transaction list of the data block containing the row piece being processed is used for the subtransaction, if an entry has not already been used for the subtransaction. At step 534, the row piece is modified. Execution of the steps returns to step 526.

When a spanning row is updated, the update may cause the generation of another row piece. The row piece may be inserted using the steps shown in FIG. 3.

Adherence to the row collision protocol avoids self-deadlocks of distributed transactions that entail DML operations to a table. However, deadlocks can occur if independent transactions are also performing DML operations on the table. The deadlocks can occur because, for a given data block with overflow row pieces, there are not a sufficient number of transaction entries for both the independent transaction and the subtransactions of the distributed transaction.

Such deadlocks can be avoided. Specifically, for a distributed transaction and independent transaction that entail DML operations on a table, the distributed transaction and independent transactions can be prevented from running concurrently. Various measures may be used to ensure that the distributed transaction and independent transaction do not execute concurrently. For example, a DBA may make a database system unavailable to users who could start independent transactions while the distributed transaction is running. Preferably, the database system is configured to prevent an independent transaction that modifies a table from executing while any distributed transaction that performs DML operations on the table is executing.

While the present invention has been illustrated using a row collision protocol based on whether a data block assigned to a slave contains a head row piece, other criteria may be used to ensure that the number of subtransactions that affect a data block can be supported by the data block and transaction processing scheme. For example, a spanning row may alternatively be modified only by the subtransaction that is assigned to the data block that contains the last overflow row piece of the spanning row. The implementation of the row collision protocol should account for how the transaction list entries are maintained.

Hardware Overview

Figure 6:
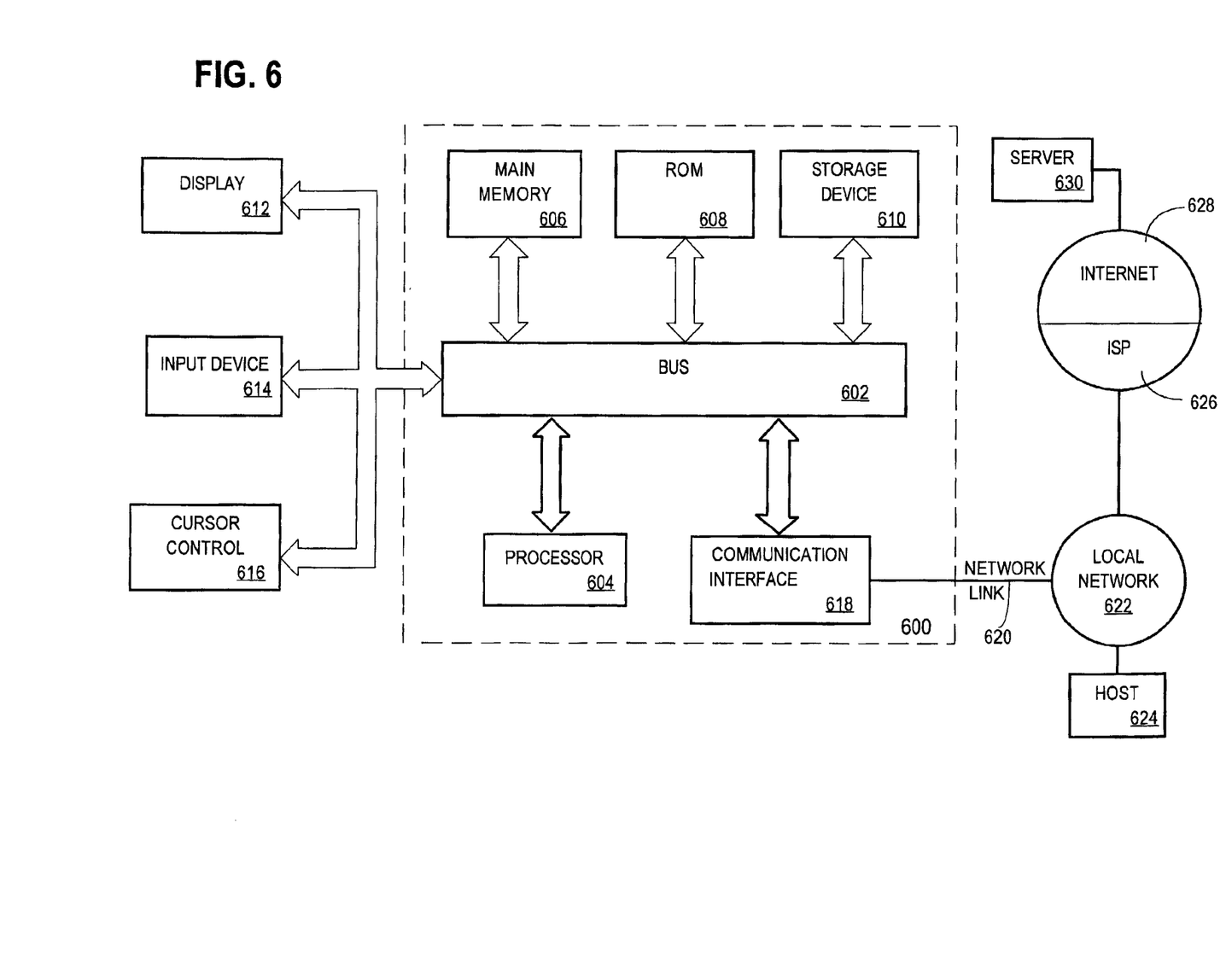
FIG. 6 is a computer system which may be used to implement an embodiment of the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for performing DML database tasks in parallel using multiple processes. According to one embodiment of the invention, performing DML database tasks in parallel using multiple processes is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for performing DML database tasks in parallel using multiple processes as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method of modifying data in a database system, the method comprising the steps of:

constructing work granules that manipulate rows in a manner that groups the rows within said work granules according to logical storage units that contain the rows; and during execution by an entity of a particular work granule that involves manipulation operations for rows in a logical storage unit:

causing said entity to perform said manipulation operation for rows completely contained in said logical storage unit;

determining that a set of spanning rows that are partially contained in said logical storage unit satisfy a particular condition that relates to which portion of each spanning row of said set of spanning rows resides in said logical storage unit; and causing said entity to perform said manipulation operations for all pieces of all spanning rows in said set of spanning rows based on the step of determining, and wherein said work granules are executed as part of a transaction that includes a first subtransaction and a second subtransaction, wherein a first work granule is executed as part of said first subtransaction and a second work granule is executed as part of said second subtransaction.

2. The method of claim 1, wherein said particular condition is that each spanning row in said set start in said logical storage unit.

3. The method of claim 1, wherein:

the first work granule involves manipulation operations for a first logical storage unit that includes a portion of a row;

the second work granule involves manipulation operations for a second logical storage unit that also includes another portion of said row;

the method further includes:

during execution of said first work granule,
determining that said row satisfies said particular condition, and
in response to determining that said row satisfies said particular condition, performing a manipulation operation for said row; and during execution of said second work granule,
determining that said row does not satisfy said particular condition, and
in response to determining that said row does not satisfy said particular condition, foregoing any manipulation operation for said row.

4. The method of claim 1, wherein said first work granule involves manipulation operations for a first logical storage unit that includes a portion of a row;

said second work granule involves manipulation operations for a second logical storage unit that also includes another portion of said row; and the method further includes executing a manipulation operation for said row as part of said first subtransaction.

5. The method of claim 4, wherein said first logical storage unit contains a first transaction list with a first entry, wherein said second logical storage unit contains a second transaction list with a second entry, wherein said step of executing a manipulation operation for said row includes assigning ownership of said first entry and said second entry to said first subtransaction.

6. The method of claim 1, wherein said particular logical storage unit includes a data block in said database system.

7. A method of inserting rows into logical storage units that store information in a database system, the method comprising the steps of:

inserting a first row piece of a spanning row into a first logical storage unit of said logical storage units;

wherein a certain data structure in each logical storage unit of said logical storage units is used to identify interested transactions and is not used to store any row of said each logical storage unit;

prior to inserting a second row piece of said spanning row into a second logical storage unit, determining whether one or more criteria is satisfied, wherein said one or more criteria include that said second logical storage unit has enough space allocated to allow the respective certain data structure to identify at least a threshold number of interested transactions; and inserting said second row piece of said spanning row into said second logical storage unit only when said one or more criteria are satisfied.

8. The method of claim 7, wherein said certain data structure is a transaction list with entries, wherein each entry of said entries may be owned by an interested transaction.

9. The method of claim 7, wherein said one or more criteria include that said second row piece be the second or greater row piece in said spanning row.

10. The method of claim 7, wherein said threshold number is greater than the sum of the quantity of overflow row pieces stored in said second logical storage unit after inserting said second row piece.

11. A computer-readable medium carrying one or more sequences of instructions for modifying data in a database system, wherein execution of the one or more sequences of instruction by one or more processors to perform the steps of:

constructing work granules that manipulate rows in a manner that groups the rows within said work granules according to logical storage units that contain the rows; and during execution by an entity of a particular work granule that involves manipulation operations for rows in a logical storage unit:

causing said entity to perform said manipulation operations for rows completely contained in said logical storage unit;

determining that a set of spanning rows that are partially contained in said logical storage unit satisfy a particular condition that relates to which portion of each spanning row of said set of spanning rows resides in said logical storage unit; and causing said entity to perform said manipulation operations for all pieces of all spanning rows in said set of spanning rows based on the step of determining, and wherein said work granules are executed as apart of a transaction that incudes a first subtransaction and a second substransaction, wherein a first work granule is executed as part of said first subtransaction and a second work granule is executed as part of said second subtransaction.

12. The computer-readable media of claim 11, wherein said particular condition is that each spanning row in said set start in said logical storage unit.

13. The computer-readable media of claim 11, wherein:

the first work granule involves manipulation operations for a first logical storage unit that includes a portion of a row;

the second work granule involves manipulation operations for a second logical storage unit that also includes another portion of said row;

the computer-readable media further includes instructions for performing:

during execution of said first work granule,
determining that said row satisfies said particular condition, and in response to determining that said row satisfies said particular condition, performing a manipulation operation for said row; and during execution of said second work granule,
determining that said row does not satisfy said particular condition, and
in response to determining that said row does not satisfy said particular condition, foregoing any manipulation operation for said row.

14. The computer-readable media of claim 11, wherein
said first work granule involves manipulation operations for a first logical storage unit that includes a portion of a row;
said second work granule involves manipulation operations for a second logical storage unit that also includes another portion of said row; and
the computer-readable media further includes instructions for executing a manipulation operation for said row as part of said first subtransaction.

15. The computer-readable media of claim 14, wherein said first logical storage unit contains a first transaction list with a first entry, wherein said second logical storage unit contains a second transaction list with a second entry, wherein said step of executing a manipulation operation for said row includes assigning ownership of said first entry and said second entry to said first subtransaction.

16. The computer-readable media of claim 11, wherein said particular logical storage unit includes a data block in said database system.

17. A computer-readable medium carrying one or more sequences of instructions for inserting rows into logical storage units that store information in a database system, wherein execution of the one or more sequences of instructions by one or more processors causes the one or more processors to perform the steps of:

inserting a first row piece of a spanning row into a first logical storage unit of said logical storage units;
wherein a certain data structure in each logical storage unit of said logical storage units is used to identify interested transactions and is not used to store any row of said each logical storage unit;
prior to inserting a second row piece of said spanning row into a second logical storage unit, determining whether one or more criteria is satisfied, wherein said one or more criteria include that said second logical storage unit has enough space allocated to allow the respective certain data structure to identify at least a threshold number of interested transactions; and
inserting said second row piece of said spanning row into said second logical storage unit only when said one or more criteria are satisfied.

18. The computer-readable media of claim 17, wherein said certain data structure is a transaction list with entries, wherein each entry of said entries may be owned by an interested transaction.

19. The computer-readable media of claim 17, wherein said one or more criteria include that said second row piece be the second or greater row piece in said spanning row.

20. The computer-readable media of claim 17, wherein said threshold number is greater than the sum of the quantity of overflow row pieces stored in said second logical storage unit after inserting said second row piece.

* * * * *